(12) United States Patent
Gross et al.

(10) Patent No.: US 7,076,389 B1
(45) Date of Patent: Jul. 11, 2006

(54) METHOD AND APPARATUS FOR VALIDATING SENSOR OPERABILITY IN A COMPUTER SYSTEM

(75) Inventors: Kenneth C. Gross, San Diego, CA (US); Eugenio J. Schuster Rosa, La Jolla, CA (US)

(73) Assignee: SUN Microsystems, Inc., Santa Clara, CA (US)

( * ) Notice: Subject to any disclaimer, the term of this patent is extended or adjusted under 35 U.S.C. 154(b) by 0 days.

(21) Appl. No.: 10/899,709

(22) Filed: Jul. 26, 2004

Related U.S. Application Data

(63) Continuation-in-part of application No. 10/739,474, filed on Dec. 17, 2003.

(51) Int. Cl.
*G06F 19/00* (2006.01)

(52) U.S. Cl. .................................. 702/116
(58) Field of Classification Search ............. 702/108, 702/112, 116, 117
See application file for complete search history.

(56) References Cited

U.S. PATENT DOCUMENTS

| | | | | |
|---|---|---|---|---|
| 4,937,763 A | | 6/1990 | Mott ........................ 364/550 |
| 5,046,028 A | * | 9/1991 | Bryan et al. ............... 702/116 |
| 5,749,047 A | * | 5/1998 | Cabot ...................... 455/67.14 |
| 6,016,465 A | * | 1/2000 | Kelly ......................... 702/116 |
| 6,236,951 B1 | * | 5/2001 | Payne et al. ............... 702/116 |
| 2004/0194910 A1 | * | 10/2004 | Garner et al. ............. 165/11.1 |
| 2004/0260511 A1 | * | 12/2004 | Burke et al. ............... 702/182 |

\* cited by examiner

*Primary Examiner*—John Barlow
*Assistant Examiner*—Jonathan Moffat
(74) *Attorney, Agent, or Firm*—Park, Vaughan & Fleming, LLP; Shun Yao

(57) ABSTRACT

One embodiment of the present invention provides a system that validates sensor operability in a computer system. During operation, the system perturbs the computer system with an excitation, wherein the excitation may be physical or software-based. The system then receives a number of responses to the excitation through sensors in the computer system, wherein each response is represented as a value of a variable which may vary with time. Next, the system compares the received responses with a set of reference responses gathered from properly functioning sensors in a reference computer system. The system then determines from the comparison whether the sensors in the computer system are operating properly.

20 Claims, 4 Drawing Sheets

METHOD AND APPARATUS FOR VALIDATING SENSOR OPERABILITY IN A COMPUTER SYSTEM

RELATED APPLICATIONS

This application is a continuation-in-part of a pending U.S. patent application, entitled "Method and Apparatus for Determining the Effects of Temperature Variations within a Computer System," by inventors Aleksey M. Urmanov, Lawrence G. Votta, Kenneth C. Gross and Su-Jaen Huang, Ser. No. 10/739,474, filed 17 Dec. 2003. This application hereby claims priority under 35 U.S.C. §120 to the above-listed patent application.

BACKGROUND

1. Field of the Invention

The present invention relates to techniques for enhancing the reliability of computer systems. More specifically, the present invention relates to a method and an apparatus for large-scale, simultaneous validation of sensor operability within a computer system to enhance availability, quality of service and/or security.

2. Related Art

As electronic commerce grows increasingly more prevalent, businesses are increasingly relying on enterprise computing systems to process ever-larger volumes of electronic transactions. A failure in one of these enterprise computing systems can be disastrous, potentially resulting in millions of dollars of lost business. More importantly, a failure can seriously undermine consumer confidence in a business, making customers less likely to purchase goods and services from the business. Hence, it is critically important to ensure high availability in such enterprise computing systems.

To achieve high availability in enterprise computing systems, it is necessary to be able to capture unambiguous diagnostic information that can quickly pinpoint the source of defects in hardware or software. If systems have too little event monitoring, when problems crop up at a customer site, service engineers may be unable to quickly identify the source of the problem. This can lead to increased down time, which can adversely impact customer satisfaction and loyalty.

Fortunately, high-end computer servers, such as those manufactured by SUN Microsystems Inc. of Santa Clara, Calif., are now equipped with over 1000 sensors that measure variables such as temperature, voltage, current, vibration, and acoustics. These sensors are accurately calibrated during manufacturing and operational testing. However, after a server is shipped to a customer, there is presently no method to validate that these sensors are still operating within their desired specifications. Furthermore, the sensors often have shorter mean-time-between-failures (MTBF) than that of the computer systems they protect.

The effect of sensor failures or sensor degradation can be very costly in enterprise computing centers. If a sensor fails (i.e., it is no longer sensing the variable it monitors), the server protected by that sensor becomes potentially susceptible to severe failure modes (for example, over-temperature or over-voltage events). On the other hand, if sensors gradually drift out of calibration, or if they lose their dynamic response capability, then the resultant drift in the monitored value of the corresponding variable can cause system boards, components, or entire servers to shut down prematurely from "false alarm" events.

Manual recalibration of sensors is a labor-intensive and costly process that requires the server be brought down, and which consequently affects datacenter availability. Moreover, large-scale recalibration of sensors in large servers is impractical because of the difficulty in removing all system boards and components from the chassis. Finally, if the chassis needs to be opened for an engineer to calibrate even one sensor, it is likely to cause "maintenance induced failures," i.e., the maintenance procedures can affect other interconnects or components and cause them to fail subsequently with an elevated probability.

Hence, what is needed is a method and an apparatus for validating the operability of sensors in a computer system without the need to open the chassis.

SUMMARY

One embodiment of the present invention provides a system that validates sensor operability in a computer system. During operation, the system perturbs the computer system with an excitation, wherein the excitation may be physical or software-based. The system then receives a number of responses to the excitation through a number of sensors in the computer system, wherein each response is represented as a value of a variable which may vary with time. Next, the system compares the received responses with a set of reference responses gathered from a number of properly functioning sensors in a reference computer system. The system then determines from the comparison whether the sensors in the computer system are operating properly.

In a variation of this embodiment, the system obtains the set of reference responses from a reference computer system by perturbing the reference computer system with the same excitation, and by receiving the set of reference responses through the properly functioning sensors in the reference computer system.

In a further variation, the system ranks coupling coefficients associated with each sensor, wherein the coupling coefficient of a sensor indicates the strength of this sensor's response with respect to an excitation at a given frequency.

In a variation of this embodiment, perturbing the computer system with the excitation involves varying the environment temperature in which the computer system operates; varying the load on the computer system; or varying the memory usage of the computer system.

In a further variation, varying the environment temperature in which the computer system operates involves varying a flow of a coolant through the computer system.

In a variation of this embodiment, perturbing the computer system with the excitation involves perturbing the computer system with a sinusoidal signal.

In a variation of this embodiment, perturbing the computer system with the excitation involves perturbing the computer system with multiple sinusoidal signals.

In a variation of this embodiment, comparing the received responses with the set of reference responses involves: computing a coupling coefficient for each received response at a given frequency under the excitation, wherein the coupling coefficient indicates the strength of the received response with respect to the excitation at the given frequency; and comparing the coupling coefficient at the given frequency for each received response with the coupling coefficient at the given frequency for the corresponding reference response.

In a further variation, comparing the received responses with the set of reference responses further involves arranging the received responses based on the order in which the corresponding coupling coefficients in the reference computer system are ranked.

In a further variation, computing the coupling coefficient for a received response at a given frequency under an excitation involves: computing a cross correlation between the received response and the excitation; performing a Fourier transform on the cross correlation so that the cross correlation is represented in frequency domain; performing a Fourier transform on the excitation so that the excitation is represented in frequency domain; and dividing the amplitude of the cross correlation at the given frequency by the amplitude of the excitation at the given frequency.

In a further variation, if a received response's coupling coefficient at a given frequency deviates by a pre-determined value from the coupling coefficient of the corresponding reference response at the given frequency, the system determines that a sensor corresponding to that received response is not operating properly.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computer System

Figure 1:
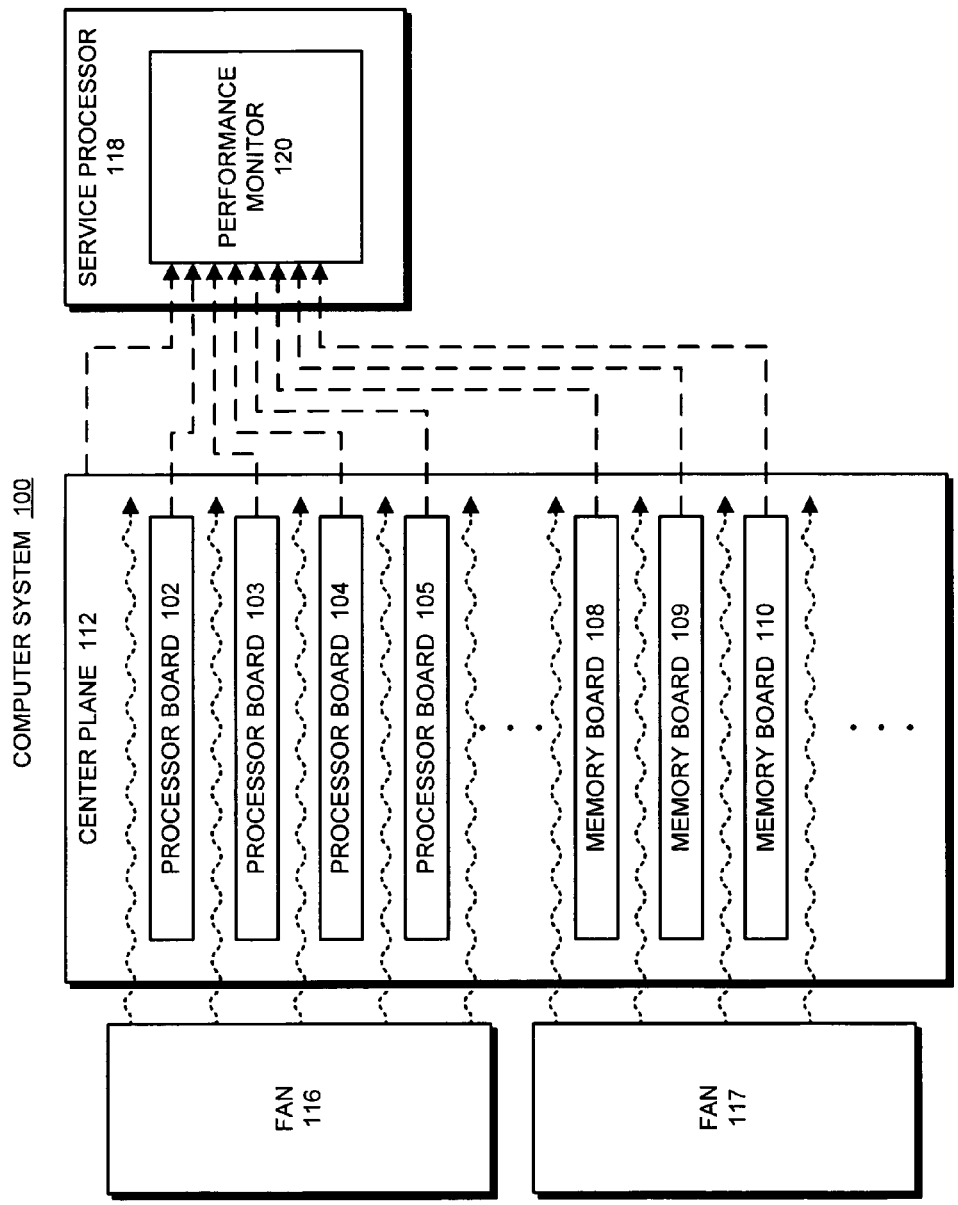
FIG. 1 illustrates a computer system which includes a service processor for processing sensor data.

FIG. 1 illustrates a computer system 100 which includes a service processor for processing sensor data. As is illustrated in FIG. 1, computer system 100 includes a number of processor boards 102–105 and a number of memory boards 108–110, which communicate with each other through center plane 112. Computer system 100 also includes cooling fans 116 and 117, which circulate air within computer system 100 to maintain a normal operational temperature.

In the example shown in FIG. 1, these system components are implemented as replaceable units (FRUs), which are independently monitored. Note that all major system units, including both hardware and software, can be decomposed into FRUs. For example, a software FRU can include, an operating system, a middleware component, a database, or an application.

Computer system 100 is associated with a service processor 118, which can reside within computer system 100, or alternatively can reside in a standalone unit separate from computer system 100. Within service processor 118, a performance monitor 120 receives signals from a number of sensors which report values of different variables, such as temperature, voltage, current, vibration, acoustics, etc. Based on these received sensor signals, service processor 118 performs a number of diagnostic functions for computer system 100 and determines whether computer system 100 or any of its components are in a degraded state. As is shown in FIG. 1, performance monitor 120 receives sensor signals from center plane 1112, processor boards 102–105, and memory boards 108–111. Alternatively, these performance-monitoring signals can traverse a network and reach a remote monitoring center (not shown).

Although the present invention is described in the context of a server computer system 100 with multiple processor boards and an associated service processor 118, the present invention is not meant to be limited to such a server computer system. In general, the present invention can be applied to any type of computer system, with or without a service processor 118. This includes, but is not limited to, a computer system based on a microprocessor, a mainframe computer, a digital signal processor, a portable computing device, a personal organizer, a device controller, and a computational engine within an appliance.

Sensor-Operability Validation

The present invention validates the operability of sensors within a computer system by subjecting the computer system to an artificial excitation, such as controlled variations in temperature. The responses of a number of sensors are then collected, analyzed, and compared with those of a reference system. In this way, one can promptly identify a non-operable sensor.

One way to generate a controlled variation of temperature is to generate a sequential perturbation in a system's cooling-fan speeds in such a manner as to create variations in temperature throughout the inside of the server. With this method, one can make the temperature perturbation approximately sinusoidal with regard to time at any given point within the server. These temperature variations are ideally small enough to not introduce effects deleterious to the long-term reliability of the system under test, but can still create larger amplitudes, gradients, and cycle frequencies than would be observed as if the server were simply operating in a typical environment of a customer datacenter. Note that temperature is only one of the many parameters that may be varied as a form of excitation brought upon a computer system. Other forms of excitation include variations in power supply voltage, processor load, and memory usage.

Figure 2:
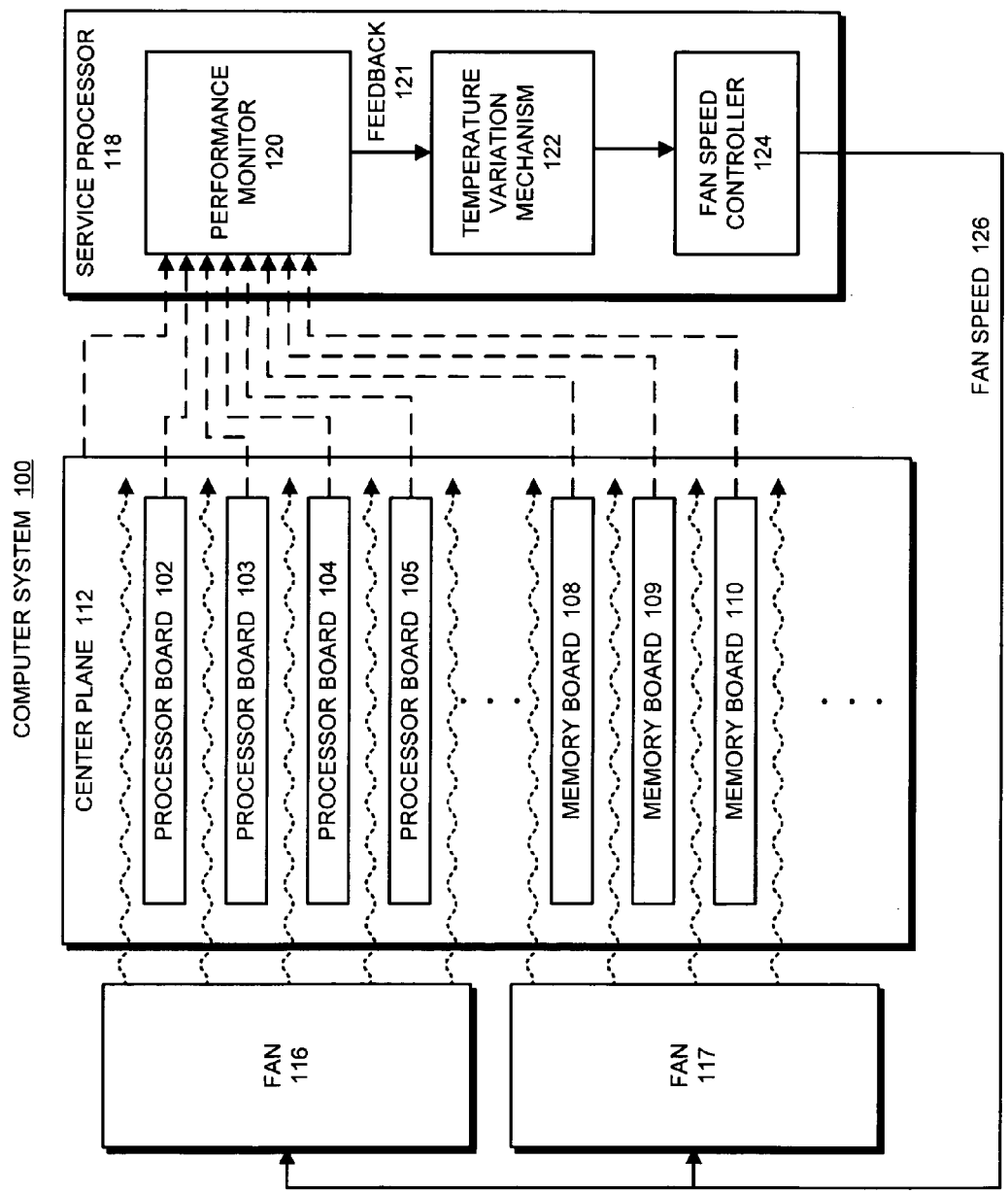
FIG. 2 illustrates a computer system which varies its operational temperature for validation of the operability of a number of sensors in accordance with an embodiment of the present invention.

FIG. 2 illustrates an exemplary embodiment of the present invention that produces controlled temperature variations. In this example, cooling fans 116 and 117 regulate airflow through computer system 100 in a manner that produces temperature variations within computer system 100. Service processor 118 includes a temperature variation mechanism 122, which operates in conjunction with a fan speed controller 124 to control the speed of cooling fans 116 and 117 through a fan speed signal 126. Note that cooling fans 116 and 117 can be controlled by changing fan speed, or if the fans only have one speed, by cycling the fans on and off.

In the example in FIG. 2, temperature variation mechanism 122 receives feedback 121 from performance monitor 120, which allows the temperature variation mechanism 122 to more accurately produce the desired temperature variations in computer system 100. In one embodiment of the presentation, temperature variation mechanism 122 is configured to produce a sinusoidal variation of temperature within computer system 100. Alternatively, temperature variation mechanism 122 can be configured to produce a superposition of multiple sinusoidal variations of temperature, so that the excitation brought upon computer system 100 contains multiple frequency components.

Once computer system 100 is subjected to an excitation, such as temperature variation produced by temperature variation mechanism 122, its sensors may receive responses to this excitation. Sensor variables may be hardware-based or software-based. Hardware-based sensor variables include distributed temperatures within the computer system, relative humidity, cumulative or differential vibrations within the computer system, fan speed, acoustic signals, current noise, voltage noise, time-domain reflectometry (TDR) readings, and miscellaneous environmental variables. Software-based sensor variables include system throughput, transaction latencies, queue lengths, load on the central processing unit, load on the memory, load on the cache, I/O traffic, bus saturation metrics, FIFO overflow statistics, and various operational profiles gathered through "virtual sensors" located within the operating system.

Figure 3:
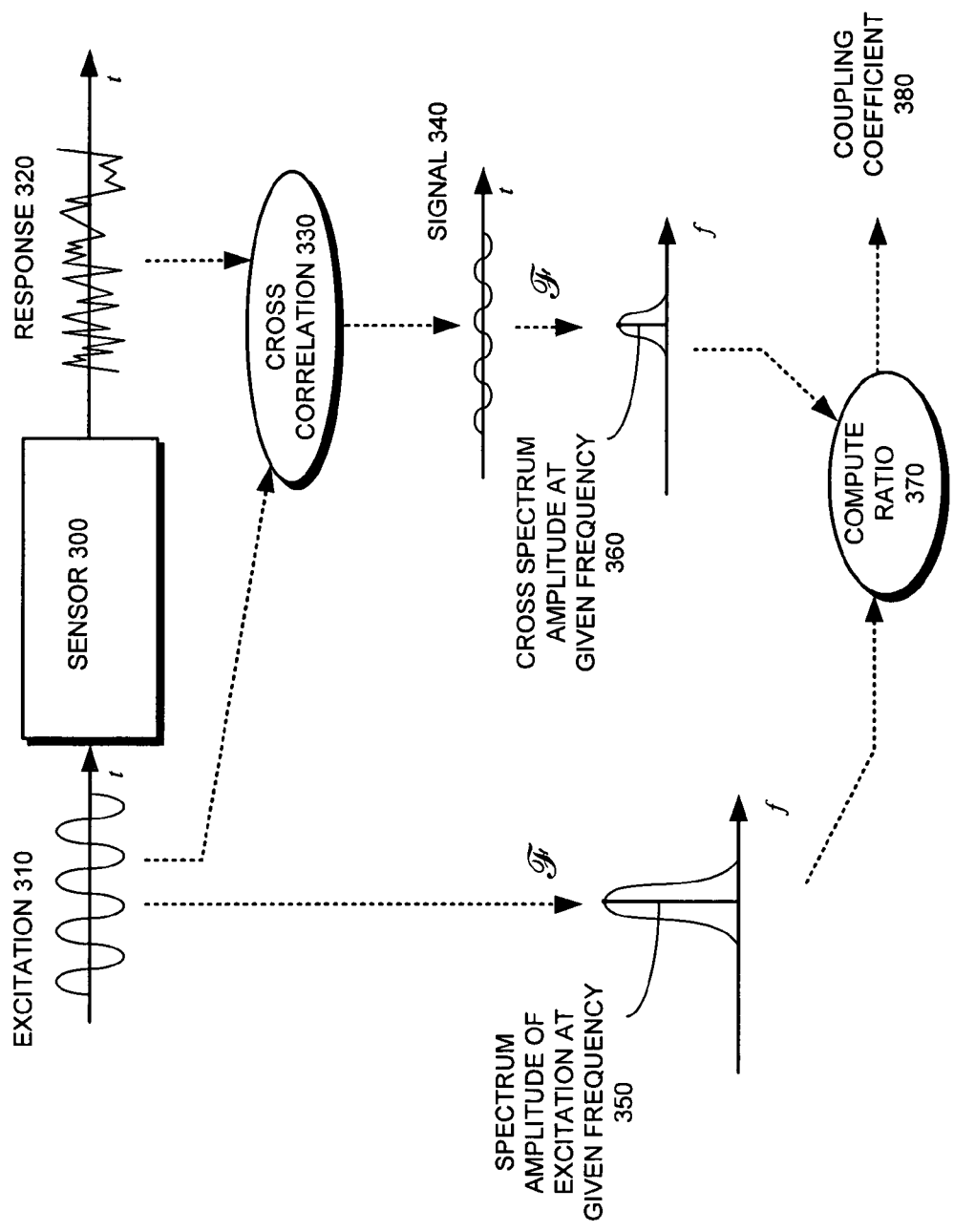
FIG. 3 illustrates the process of validating the operability of a sensor that is subjected to an excitation in accordance with an embodiment of the present invention.

FIG. 3 illustrates the process of validating the operability of a sensor that is subjected to an excitation in accordance with an embodiment of the present invention. As is illustrated in FIG. 3, a sensor under test 300 is subjected to an excitation 310 (e.g., a sinusoidal temperature variation). In response, sensor 300 produces a response signal 320, which may contain a response to excitation 310 and responses to other environmental parameters. One approach to distinguish the component of response signal 320 that is caused by excitation 310 from other components, is to compute a cross correlation 330 between response signal 320 and excitation 310. (Techniques for computing such a cross correlation are well known in the art. For example, see "An Introduction to the Analysis and Processing of Signals," by Paul A. Lynn, MacMillan 1989, page 338.) The resulting signal 340 represents the part of response signal 320 that is correlated to excitation 310.

In practice, it is generally difficult to produce an excitation that is perfectly sinusoidal. Hence, excitation 310 typically contains more than one frequency components. One can perform a Fourier transform on both excitation 310 and signal 340, so that both signals are represented in frequency domain. It is then possible to select a cross spectrum amplitude at a given frequency 360 and a spectrum amplitude of the excitation at the same frequency 350, and feed these two into a ratio-computing process 370 to produce a coupling coefficient 380 at that frequency.

The magnitude of coupling coefficient 380 is a direct measurement of the correlation of response 320 with respect to excitation 310 at a given frequency. For example, coupling coefficient 380 is defined as the cross spectrum amplitude at given frequency 360 divided by the spectrum amplitude of the excitation at the same frequency 350. In addition, coupling coefficient 380 may be defined across two different physical parameters, e.g., temperature to voltage, processor load to temperature, memory usage to temperature, etc.

The operability of sensor 300 can be validated by comparing coupling coefficient 380 with a reference coupling coefficient (not shown here), which is obtained from a corresponding sensor in a reference computer system. The reference computer system is a system in which all the sensors are known to be functioning properly within the calibration specifications. In one embodiment of the present invention, sensor 300 is considered non-operable if its coupling coefficient 380 deviates from the reference coupling coefficient by a predetermined value.

Although in this example excitation 310 contains only one sinusoidal waveform, it is possible to combine multiple waveforms in the excitation, so that a sensor's coupling coefficients at difference frequencies can be evaluated simultaneously. The cross-spectral analysis of a sensor's response allows one to compute its coupling coefficients at multiple frequencies, which in turn facilitates more accurate validation.

Figure 4:
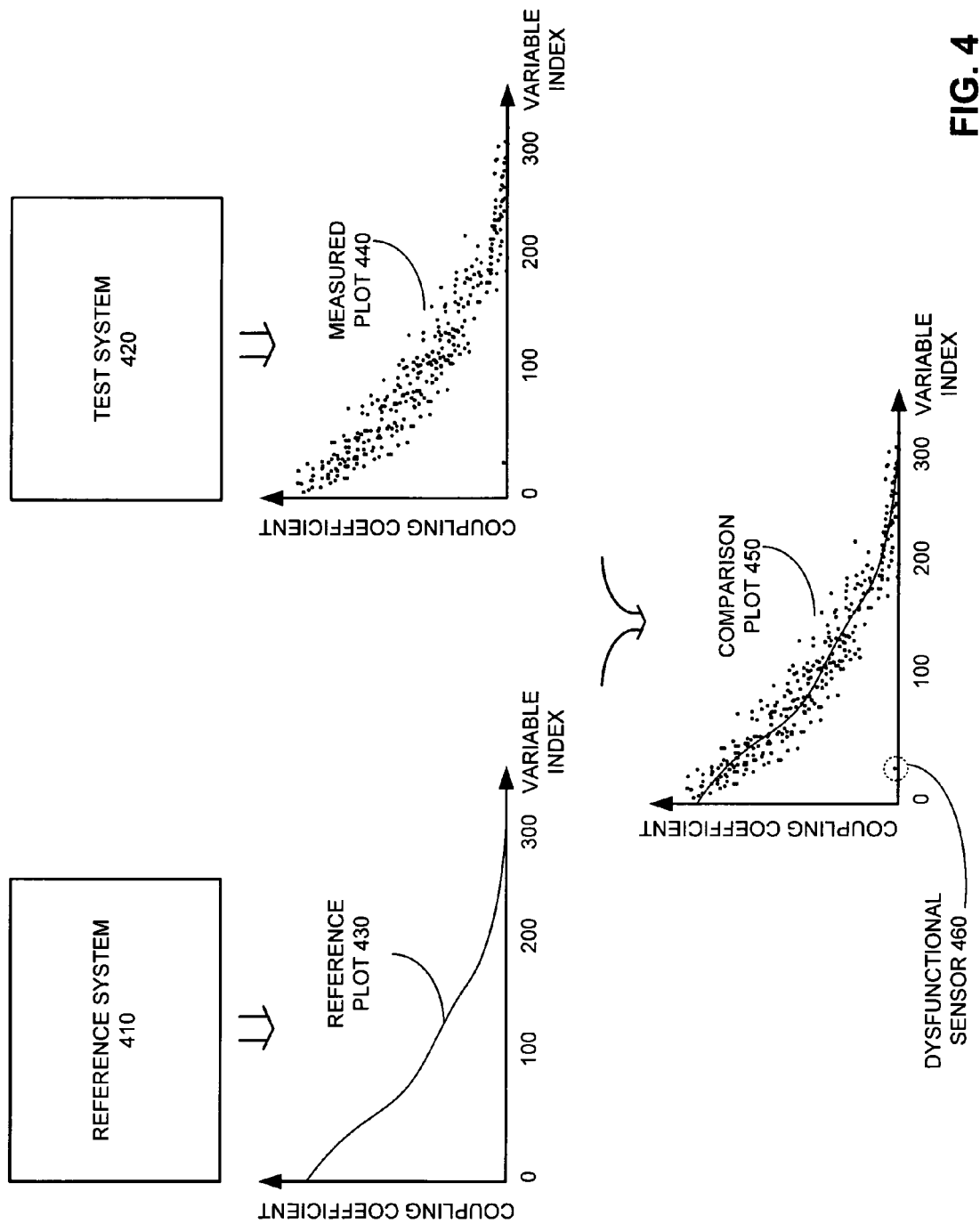
FIG. 4 illustrates the process of simultaneously validating the operability of a number of sensors subjected to an excitation in accordance with an embodiment of the present invention.

While FIG. 3 illustrates the validation process for one sensor, FIG. 4 illustrates the process of simultaneously validating the operability of a number of sensors subjected to an excitation in accordance with an embodiment of the present invention. As is shown in FIG. 4, a reference plot of coupling coefficient 430 is obtained for all the sensors in a reference system 410 under a given excitation. For purposes of visualization, the sensor variables are ranked according to the values of their respective coupling coefficient. In addition, by ranking the coupling coefficients from higher to lower, one can learn which sensor variables are more sensitive to the excitation. During a validation process, the same excitation is brought upon a test system 420. The responses of all its sensors are then collected and analyzed, and each sensor's respective coupling coefficient is computed for the same frequency component based on which the reference coupling coefficients are obtained.

Once the coupling coefficients of all the sensors in test system 420 are computed, they are plotted based on the same ranked order as the one used in reference plot 430. The result is a measured plot 440. For easy comparison, one may combine measured plot 440 and reference plot 430 to produce a comparison plot 450. Significant differences in coupling coefficients between test system 420 and reference system 410 are indication of potential faults. Note that it is this difference between coupling coefficients that allows one to identify non-operational sensors. There are different approaches to manifest this difference. For example, one approach is to directly compare the absolute values of the two sets of coupling coefficients. Another approach is to normalize the coupling coefficients of the test system against the corresponding coupling coefficients of the reference system. One may also subtract one set of coupling coefficients from the other. In the illustrated example in FIG. 4, one sensor variable has a very small coupling coefficient value compared with the corresponding reference value, indicating that the sensor associated with that variable, sensor 460, is not working properly.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. Additionally, the above disclosure is not intended to limit the invention. The scope of the invention is defined by the appended claims.

What is claimed is:

1. A method for validating sensor operability in a computer system, comprising:
   perturbing the computer system with an excitation, wherein the excitation may be physical or software-based;
   receiving feedback from the computer system, wherein the feedback allows the excitation to be adjusted to control the perturbation;
   receiving a number of responses to the excitation through a number of sensors in the computer system, wherein each response is represented as a value of a variable which may vary with time;
   comparing the received responses with a set of reference responses gathered from a number of properly functioning sensors in a reference computer system, wherein comparing the received responses with the set of reference responses involves:
      computing a coupling coefficient for each received response at a given frequency under the excitation wherein the coupling coefficient indicates the strength of the received response with respect to the excitation at the given frequency; and
      comparing the coupling coefficient at the given frequency for each received response with the coupling coefficient at the given frequency for the corresponding reference response; and
   determining from the comparison whether the sensors in the computer system are operating properly.

2. The method of claim 1, further comprising obtaining the set of reference responses from a reference computer system, by:
   perturbing the reference computer system with the same excitation; and
   receiving the set of reference responses through the properly functioning sensors in the reference computer system.

3. The method of claim 1, wherein obtaining the set of reference responses involves ranking coupling coefficients associated with each sensor in the reference computer system, wherein the coupling coefficient of a sensor indicates the strength of this sensor's response with respect to an excitation at a given frequency.

4. The method of claim 1, wherein perturbing the computer system with the excitation involves at least one of:
   varying the environment temperature in which the computer system operates;
   varying the load on the computer system; or
   varying the memory usage of the computer system.

5. The method of claim 4, wherein varying the environment temperature in which the computer system operates involves varying a flow of a coolant through the computer system.

6. The method of claim 1, wherein perturbing the computer system with the excitation involves perturbing the computer system with a sinusoidal signal.

7. The method of claim 1, wherein perturbing the computer system with the excitation involves perturbing the computer system with multiple sinusoidal signals.

8. The method of claim 1, wherein comparing the received responses with the set of reference responses involves arranging the received responses based on the order in which the corresponding coupling coefficients in the reference computer system are ranked.

9. The method of claim 1, wherein computing the coupling coefficient for a received response at a given frequency under an excitation involves:
   computing a cross correlation between the received response and the excitation;
   performing a Fourier transform on the cross correlation so that the cross correlation is represented in frequency domain;
   performing a Fourier transform on the excitation so that the excitation is represented in frequency domain; and
   dividing the amplitude of the cross correlation at the given frequency by the amplitude of the excitation at the given frequency.

10. The method of claim 1, wherein if a received response's coupling coefficient at a given frequency deviates by a predetermined value from the coupling coefficient of the corresponding reference response at the given frequency, the method further comprises determining that a sensor corresponding to that received response is not operating properly.

11. A computer-readable storage medium storing instructions that when executed by a computer cause the computer to perform a method for validating sensor operability in a computer system, the method comprising:
   perturbing the computer system with an excitation, wherein the excitation may be physical or software-based;
   receiving feedback from the computer system, wherein the feedback allows the excitation to be adjusted to control the perturbation;
   receiving a number of responses to the excitation through a number of sensors in the computer system, wherein each response is represented as a value of a variable which may vary with time;
   comparing the received responses with a set of reference responses gathered from a number of properly functioning sensors in a reference computer system, wherein comparing the received responses with the set of reference responses involves:
      computing a coupling coefficient for each received response at a given frequency under the excitation, wherein the coupling coefficient indicates the strength of the received response with respect to the excitation at the given frequency; and
      comparing the coupling coefficient at the given frequency for each received response with the coupling coefficient at the given frequency for the corresponding reference response; and
   determining from the comparison whether the sensors in the computer system are operating properly.

12. The computer-readable storage medium of claim 11, wherein the method further comprises obtaining the set of reference responses from a reference computer system, by:
   perturbing the reference computer system with the same excitation; and
   receiving the set of reference responses through the properly functioning sensors in the reference computer system.

13. The computer-readable storage medium of claim 12, wherein obtaining the set of reference responses involves ranking the coupling coefficients associated with each sensor in the reference computer system, wherein the coupling coefficient of a sensor indicates the strength of this sensor's response with respect to an excitation at a given frequency.

14. The computer-readable storage medium of claim 11, wherein perturbing the computer system with the excitation involves at least one of:

varying the environment temperature in which the computer system operates;
varying the load on the computer system; or
varying the memory usage of the computer system.

15. The computer-readable storage medium of claim 14, wherein varying the environment temperature in which the computer system operates involves varying a flow of a coolant through the computer system.

16. The computer-readable storage medium of claim 11, wherein perturbing the computer system with the excitation involves perturbing the computer system with a sinusoidal signal.

17. The computer-readable storage medium of claim 11, wherein perturbing the computer system with the excitation involves perturbing the computer system with multiple sinusoidal signals.

18. The computer-readable storage medium of claim 11, wherein comparing the received responses with the set of reference responses involves arranging the received responses based on the order in which the corresponding coupling coefficients in the reference computer system are ranked.

19. The computer-readable storage medium of claim 11, wherein computing the coupling coefficient for a received response at a given frequency under an excitation involves:
 computing a cross correlation between the received response and the excitation;
 performing a Fourier transform on the cross correlation so that the cross correlation is represented in frequency domain;
 performing a Fourier transform on the excitation so that the excitation is represented in frequency domain; and
 dividing the amplitude of the cross correlation at the given frequency by the amplitude of the excitation at the given frequency.

20. The computer-readable storage medium of claim 11, wherein if a received response's coupling coefficient at a given frequency deviates by a pre-determined value from the coupling coefficient of the corresponding reference response at the given frequency, the method further comprises determining that a sensor corresponding to that received response is not operating properly.

* * * * *